US012637361B2

(12) United States Patent
Ohara et al.

(10) Patent No.: US 12,637,361 B2
(45) Date of Patent: May 26, 2026

(54) PRODUCTION METHOD FOR COBALT SULFATE

(71) Applicant: SUMITOMO METAL MINING CO., LTD., Tokyo (JP)

(72) Inventors: Hideki Ohara, Niihama (JP); Keiji Kudou, Niihama (JP); Tatsuya Higaki, Niihama (JP); Hiroto Watanabe, Niihama (JP); Natsuki Kondou, Niihama (JP); Takashi Kaneko, Niihama (JP); Shin-ichi Heguri, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 742 days.

(21) Appl. No.: 17/925,568

(22) PCT Filed: Jan. 20, 2022

(86) PCT No.: PCT/JP2022/001899
§ 371 (c)(1),
(2) Date: Nov. 15, 2022

(87) PCT Pub. No.: WO2022/269962
PCT Pub. Date: Dec. 29, 2022

(65) Prior Publication Data
US 2024/0228320 A1     Jul. 11, 2024

(30) Foreign Application Priority Data
Jun. 25, 2021     (JP) ................................. 2021-106023

(51) Int. Cl.
C01G 51/04          (2025.01)
C01G 3/12           (2006.01)
(Continued)

(52) U.S. Cl.
CPC .......... *C01G 51/10* (2013.01); *C01P 2006/80* (2013.01)

(58) Field of Classification Search
CPC .......... C01G 51/10; C01G 3/12; C01G 51/04; C01G 51/06; C01P 2006/80;
(Continued)

(56) References Cited

U.S. PATENT DOCUMENTS 9,428,820 B2 *   8/2016   Nakai ........................ C22B 3/26
9,458,038 B2 *  10/2016   Ohara ........................ C01F 5/12
(Continued)

*Primary Examiner* — Cam N. Nguyen
(74) *Attorney, Agent, or Firm* — Kratz, Quintos & Hanson, LLP

(57)                    ABSTRACT
Provided is a method for separating impurities and cobalt without using an electrolysis process from a cobalt chloride solution containing impurities and producing a high purity cobalt sulfate. The production method for cobalt sulfate includes: a copper removal step (S1) of adding a sulfurizing agent to a cobalt chloride solution containing one or more impurities of copper, zinc, manganese, calcium, and magnesium and generating a precipitate of sulfide of copper to separate to remove copper; a neutralization step (S2) of adding a neutralizer or a carbonation agent to a cobalt chloride solution having undergone through the copper removal step (S1) and generating cobalt hydroxide or basic cobalt carbonate to separate magnesium; a leaching step (S3) of adding sulfuric acid to the cobalt hydroxide or the basic cobalt carbonate to obtain cobalt sulfate solution; and a solvent extraction step (S4) of bringing an organic solvent containing an alkyl phosphoric acid-based extractant to the cobalt sulfate solution and extracting zinc, manganese, and calcium into the organic solvent to separate to remove zinc, manganese, and calcium. These steps are sequentially executed.

6 Claims, 3 Drawing Sheets

COBALT CHLORIDE SOLUTION CONTAINING IMPURITIES

| COPPER REMOVAL STEP | S1 |

| NEUTRALIZATION STEP | S2 |

| LEACHING STEP | S3 |

| SOLVENT EXTRACTION STEP | S4 |

COBALT SULFATE SOLUTION

| CRYSTALLIZATION STEP | S5 |

COBALT SULFATE CRYSTAL

(51) Int. Cl.
  *C01G 51/06*   (2006.01)
  *C01G 51/10*   (2006.01)
  *C22B 3/08*    (2006.01)
  *C22B 3/38*    (2006.01)
  *C22B 3/44*    (2006.01)

(58) Field of Classification Search
  CPC . C22B 23/0423; C22B 3/3846; C22B 23/043;
     C22B 23/0461; C22B 3/08; C22B 3/38;
     C22B 3/44; C22B 23/0407; Y02P 10/20
  USPC ........................................................ 423/139
  See application file for complete search history.

(56) References Cited

U.S. PATENT DOCUMENTS

| | | | | |
|---|---|---|---|---|
| 9,499,879 | B2 * | 11/2016 | Ozaki | C22B 7/007 |
| 10,577,255 | B2 * | 3/2020 | Ohara | C01G 51/10 |
| 12,000,018 | B2 * | 6/2024 | Higaki | C22B 23/043 |
| 12,054,401 | B2 * | 8/2024 | Fraser | C22B 26/12 |
| 12,441,621 | B2 * | 10/2025 | Fraser | C01G 53/10 |
| 2014/0322109 | A1 * | 10/2014 | Nakai | C22B 3/26 |
| | | | | 423/139 |
| 2016/0010177 | A1 * | 1/2016 | Goto | C22B 3/381 |
| | | | | 423/21.5 |
| 2016/0115563 | A1 * | 4/2016 | Kotiranta | C22B 23/043 |
| | | | | 75/743 |
| 2022/0009793 | A1 * | 1/2022 | Fraser | C01G 51/04 |
| 2022/0267877 | A1 * | 8/2022 | Smit | C22B 15/0089 |
| 2023/0183091 | A1 * | 6/2023 | Watanabe | B01D 9/0022 |
| | | | | 423/139 |
| 2025/0043383 | A1 * | 2/2025 | Takenouchi | C22B 23/0415 |

* cited by examiner

COBALT CHLORIDE SOLUTION CONTAINING IMPURITIES

COPPER REMOVAL STEP — S1

NEUTRALIZATION STEP — S2

LEACHING STEP — S3

SOLVENT EXTRACTION STEP — S4

COBALT SULFATE SOLUTION

CRYSTALLIZATION STEP — S5

COBALT SULFATE CRYSTAL

PRODUCTION METHOD FOR COBALT SULFATE

TECHNICAL FIELD

The present invention relates to a production method for cobalt sulfate. More specifically, the present invention relates to a production method for obtaining high-purity cobalt sulfate by removing impurity elements contained in a cobalt chloride solution.

BACKGROUND ART

Cobalt is a valuable metal that is widely used in industry applications as a raw material for a magnetic material and a lithium-ion secondary battery, in addition to the application as an additional element for special alloys. Especially, in recent years, many lithium-ion secondary batteries are used as a battery for mobile devices and electric vehicles, and in accordance with this, demand for cobalt is also rapidly expanding. However, since most of cobalt is produced as a by-product of nickel smelting and copper smelting, separation from impurities such as nickel and copper is an important element technology in the production of cobalt.

For example, when cobalt is recovered as a by-product in hydrometallurgy/wet smelting of nickel, first, in order to obtain a solution containing nickel and cobalt, raw material is leached or extracted into the solution using a mineral acid, an oxidant, or the like, or is subjected to a dissolving treatment. Furthermore, nickel and cobalt contained in the obtained acidic solution are often separated and recovered by a solvent extraction method using various organic extractants by a conventionally known method.

However, the obtained cobalt solution often contains various impurities derived from the treated raw material.

Therefore, it is further required to remove impurity elements such as manganese, copper, zinc, calcium, and magnesium from the cobalt solution after nickel is separated and recovered by the above-described solvent extraction method.

Moreover, in order to produce a high purity cobalt product with low impurity content, it was required to commercialize cobalt by an electrolysis process, crystallization, or the like after preliminarily removing impurity elements in the cobalt solution separated and recovered from a cobalt-containing nickel solution.

As a method for removing impurity elements in the cobalt solution, there are prior arts described in Patent Documents 1 and 2.

Patent Document 1 discloses a purification method of a cobalt solution including (1) a copper removal step of adding a sulfurizing agent into the cobalt solution and adjusting a redox potential (ORP) (based on Ag/AgCl electrodes) to 50 mV or less and a pH to 0.3 to 2.4 to obtain a copper sulfide precipitate and a copper-removed purified liquid, (2) a manganese removal step of adding an oxidant and a neutralizer into the copper-removed purified liquid and adjusting the redox potential (based on the Ag/AgCl electrodes) to 950 mV to 1050 mV and the pH to 2.4 to 3.0 to obtain a manganese precipitate and a manganese-removed purified liquid, (3) a solvent extraction step of using an alkyl phosphoric acid as an extractant into the manganese-removed purified liquid to extract and separate zinc, calcium, and trace impurities in the manganese-removed purified liquid.

Patent Document 2 discloses a technique in which a cobalt chloride solution having a hydrochloric acid concentration of 2 to 6 mol/L is brought into contact with an anion-exchange resin, and metallic impurities such as iron, zinc, and tin that form a complex having a distribution coefficient for an anion-exchange resin larger than that of a cobalt chloride complex are adsorbed and separated.

The solvent extraction method using the alkyl phosphoric acid as the extractant, which is disclosed in Patent Document 1 described above, has high separation performance with respect to zinc and calcium. However, in a case of the cobalt chloride solution having a hydrochloric acid concentration of 2 to 6 mol/L, an ion exchange method by the anion-exchange resin and the solvent extraction method by an amine-based extractant has the separation performance for zinc and cobalt higher compared to that of the solvent extraction method using the above-described alkyl phosphoric acid.

When a very trace amount of zinc in the cobalt chloride solution is removed, the ion exchange method is more efficient and economical because the process and the operation are simpler.

From this point of view, as a method to remove the impurity elements from the cobalt chloride solution containing manganese, copper, zinc, a method combining the purification method of Patent Document 1 described above and the separation technique of Patent Document 2 described above has been proposed (for example, Patent Document 3).

A high purity cobalt chloride production method disclosed in the paragraph 0022 of Patent Document 3 includes a solvent extraction step of separating nickel and cobalt, a manganese removal step of removing manganese, a copper removal step of removing copper, a dezincification step of removing zinc, and an electrolysis step.

In the dezincification step, zinc is adsorbed and removed by bringing the cobalt chloride aqueous solution obtained in the copper removal step into contact with an anion-exchange resin. In the electrolysis process, metallic cobalt (also referred to as electric cobalt) is produced by using the high purity cobalt chloride aqueous solution obtained in the dezincification step as an electrolyte supplying liquid.

On the other hand, as described above, in recent years, demand for cobalt is expanding as a raw material of lithium ion secondary battery, and a form of the cobalt sulfate solution or cobalt sulfate crystal is desired.

When it is attempted to obtain cobalt sulfate crystal from the metallic cobalt obtained by the prior art of Patent Document 3, the cobalt sulfate crystal can be obtained by dissolving the metallic cobalt with sulfuric acid to obtain the cobalt sulfate solution and then crystallizing the solution. However, using this production method increases production cost due to an increased number of processes and increased cost for an agent. Plate-shaped metallic cobalt has a low dissolution rate in sulfuric acid as used in corrosion-resistant alloy, and thus, to dissolve it in a short time, it is required to powder the plate-shaped metallic cobalt by atomization treatment or the like.

Thus, a method of directly obtaining cobalt sulfate solution from a cobalt chloride solution without undergoing through metallic cobalt has been desired.

CITATION LIST

Patent Literature

Patent Document 1: JP-A-2004-285368
Patent Document 2: JP-A-2001-020021
Patent Document 3: JP-A-2020-019664

SUMMARY OF INVENTION

Technical Problem

The present invention has been proposed in consideration of the above-described circumstances, and it is an object of the present invention to provide a method for separating impurities and cobalt without using an electrolysis process from a cobalt chloride solution containing impurities and producing a high purity cobalt sulfate.

Solution to Problem

A production method for cobalt sulfate in a first invention includes: a copper removal step of adding a sulfurizing agent to a cobalt chloride solution containing one or more impurities of copper, zinc, manganese, calcium, and magnesium and generating a precipitate of sulfide of copper to separate to remove copper; a neutralization step of adding a neutralizer or a carbonation agent to a cobalt chloride solution having undergone through the copper removal step and generating cobalt hydroxide or basic cobalt carbonate to separate magnesium; a leaching step of adding sulfuric acid to the cobalt hydroxide or the basic cobalt carbonate to obtain cobalt sulfate solution; and a solvent extraction step of bringing an organic solvent containing an alkyl phosphoric acid-based extractant to the cobalt sulfate solution and extracting zinc, manganese, and calcium into the organic solvent to separate to remove zinc, manganese, and calcium. These steps are sequentially executed.

In the production method for the cobalt sulfate of a second invention, in the first invention, the neutralizer or the carbonation agent in the neutralization step is added by a countercurrent multistage method.

In the production method for the cobalt sulfate of a third invention, in the first invention or the second invention, a cobalt sulfate solution obtained through the solvent extraction step is subjected to a crystallization step to obtain crystals of the cobalt sulfate.

In the production method for the cobalt sulfate of a fourth invention, in the first invention or the second invention, in the copper removal step, an oxidant and a neutralizer are added to the cobalt chloride solution where the sulfurizing agent is added to adjust a redox potential to $-100$ mV to 200 mV (based on an Ag/AgCl electrodes) and the pH to 1.3 to 3.0.

In the production method for the cobalt sulfate of a fifth invention, in the first invention, the second invention, or the fourth invention, in the neutralization step, the pH is adjusted to 6.5 to 7.0.

In the production method for the cobalt sulfate of a sixth invention, in the first invention, the second invention, the third invention, or the fourth invention, in the leaching step, the pH is adjusted to 2.0 to 5.0 to obtain the cobalt sulfate solution.

In the production method for the cobalt sulfate of a seventh invention, in the first invention or the second invention, in the solvent extraction step, the alkyl phosphoric acid-based extractant is bis (2-ethylhexyl) hydrogen phosphate, and the pH of the cobalt sulfate solution where copper and magnesium are removed is adjusted to 1.5 to 3.0 to be subjected to a solvent extraction using the extractant, and impurity elements are extracted into the organic solvent.

Advantageous Effects of Invention

According to the first invention, from the cobalt chloride solution containing impurities, sulfide of copper is precipitated in the copper removal step, magnesium is separated and removed in the neutralization step, the cobalt sulfate solution is obtained in the leaching step, and zinc, manganese, and calcium are separated and removed by the solvent extraction step, and thus, without using an electrolysis process, the high purity cobalt sulfate can be directly produced by separating impurities and cobalt.

According to the second invention, by supplying a product generated by the neutralization or the carbonation to a previous stage in a countercurrent multistage method, it is possible to decrease a loss of cobalt by reducing cobalt remaining in the solution and simultaneously, reduce cost by decreasing a loss of the neutralizer or the carbonation agent remaining unreacted.

According to the third invention, by further executing the crystallization step, the high purity cobalt sulfate crystals can be obtained from the cobalt sulfate solution.

According to the fourth invention, since the redox potential and the pH range are appropriate, it is possible to precipitate the sulfide of copper from the cobalt chloride solution to sufficiently remove copper and reduce coprecipitation of cobalt.

According to the fifth invention, by adjusting the pH in the neutralization step to 6.5 to 7.0 to precipitate cobalt and leave magnesium in the solution, both materials can be separated.

According to the sixth invention, by adjusting the pH to 2.0 to 5.0, it is possible to reduce mixing of iron and aluminum as impurities and convert a form from the cobalt chloride solution into the cobalt sulfate solution.

According to the seventh invention, the alkyl phosphoric acid-based extractant is bis (2-ethylhexyl) hydrogen phosphate, and by adjusting the pH of the cobalt sulfate solution to 1.5 to 3.0 and subjecting it to the solvent extraction, impurity elements are extracted in the organic solvent and cobalt is left in the aqueous phase, and thus cobalt and the impurity elements can be separated.

DESCRIPTION OF EMBODIMENTS

The following describes specific embodiments of the present invention in detail. Note that the present invention is not limited to the following embodiments, and various modifications can be made in a range that does not change the gist of the present invention.

Principle of the Present Invention

A production method for cobalt sulfate according to the present invention will be described based on FIG. 1.

In this production method, the following steps are sequentially executed. (1) a copper removal step S1 of adding a sulfurizing agent to a cobalt chloride solution containing one or more impurities of copper, zinc, manganese, calcium, magnesium and generating a precipitate of sulfide of copper to separate to remove copper, (2) a neutralization step S2 of adding a neutralizer or a carbonation agent to the cobalt chloride solution where copper is removed by the copper removal step S1 and generating cobalt hydroxide or basic cobalt carbonate to separate magnesium, (3) a leaching step S3 of adding sulfuric acid to the cobalt hydroxide or the basic cobalt carbonate obtained by the neutralization step S2 to obtain a cobalt sulfate solution, (4) a solvent extraction step S4 of bringing an organic solvent containing an alkyl phosphoric acid-based extractant to the cobalt sulfate solution obtained by the leaching step S3 and extracting zinc, manganese, and calcium into the organic solvent to separate zinc, manganese, and calcium are sequentially executed.

In the present invention, a crystallization step S5 for precipitating crystals from the cobalt sulfate solution is executed as necessary after each of the steps S1 to S4.

Figure 1:
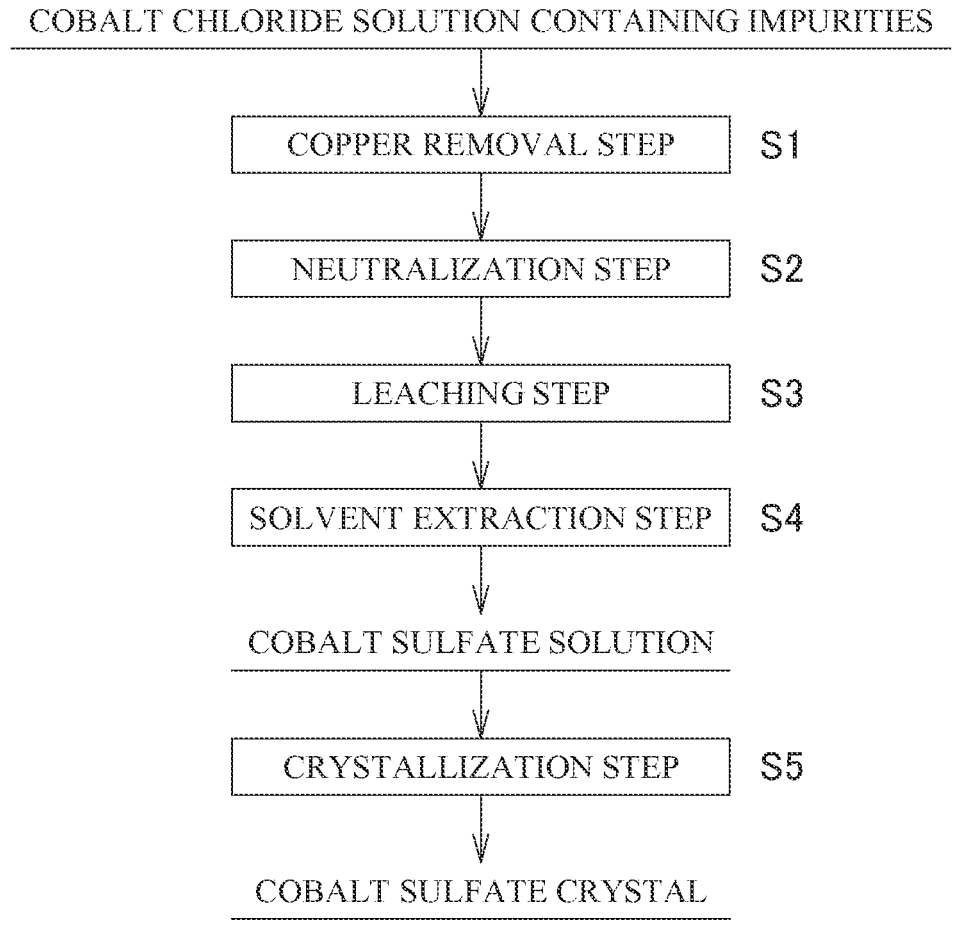
FIG. 1 is a process diagram illustrating a production method for cobalt sulfate according to the present invention.

While not illustrated in FIG. 1, after the solvent extraction step S4, a step of subjecting to an oil-water separator such as an activated carbon column may be added so as to separate to remove organic components mixed in the liquid.

The cobalt chloride solution as a starting material in the present invention contains one or more of copper, zinc, manganese, calcium, and magnesium as the impurity elements. While there is no limitation for applying the present invention, as long as a cobalt chloride solution contains such impurities, the present invention is preferably applied to a cobalt chloride solution after, especially in the solvent extraction step of nickel smelting, nickel is separated and recovered by an alkyl phosphoric acid-based extractant or an amine-based extractant from a nickel solution containing cobalt.

According to the present invention, a high purity cobalt sulfate solution can be obtained by generating a sulfide precipitate of copper to remove copper by the copper removal step S1, removing magnesium by the neutralization step S2, obtaining the cobalt sulfate solution by the leaching step S3, and separating zinc, manganese, and calcium by the solvent extraction step S4, from the cobalt chloride solution. Accordingly, it is possible to directly produce a high purity cobalt sulfate solution by separating impurities and cobalt without using an electrolysis step.

EMBODIMENT

The following describes the embodiments of the production method for the cobalt sulfate based on FIG. 1.
(Copper Removal Step S1)

The copper removal step S1 is performed by adding the sulfurizing agent to the cobalt chloride solution as a starting raw material containing one or more impurities of copper, zinc, manganese, calcium, and magnesium. An oxidant and the neutralizer are added to adjust a redox potential of the cobalt chloride solution to −100 mV to 200 mV (based on Ag/AgCl electrodes) and a pH to 1.3 to 3.0.

This step allows generating and separating a precipitate of the sulfide of copper from the cobalt chloride solution and obtaining the cobalt chloride solution where cobalt is removed.

Copper in the cobalt chloride solution is removed from the solution by generating the precipitate of copper sulfide in accordance with the following formula 1, formula 2, or formula 3.

$$CuCl_2 + H_2S \rightarrow CuS\downarrow + 2HCl \qquad \text{(Formula 1)}$$

$$CuCl_2 + Na_2S \rightarrow CuS\downarrow + 2NaCl \qquad \text{(Formula 2)}$$

$$CuCl_2 + NaHS \rightarrow CuS\downarrow + NaCl + HCl \qquad \text{(Formula 3)}$$

In the copper removal step S1 described above, when the redox potential of the cobalt chloride solution is adjusted to −100 mV to 200 mV (based on the Ag/AgCl electrodes) and the pH is adjusted to 1.3 to 3.0, copper can be precipitated as the sulfide to be sufficiently removed, and coprecipitation of cobalt can be suppressed.

When the redox potential exceeds 200 mV, the removal of copper in the solution becomes insufficient, and when the redox potential is less than −100 mV, the amount of coprecipitation of cobalt increases, which is not preferable. When the pH is less than 1.3, the removal of copper in the solution becomes insufficient, and filterability of the formed sulfide precipitate deteriorates. When the pH exceeds 3.0, the amount of coprecipitation of cobalt associated with the removal of copper increases, which is not preferable.

The redox potential can be adjusted by adjusting an addition amount of the sulfurizing agent. While the sulfurizing agent is not particularly limited, hydrogen sulfide gas, crystals, aqueous solutions, or the like of sodium sulfide or sodium hydrosulfide can be used.

When the hydrogen sulfide or the sodium hydrosulfide is used as a sulfurizing agent, the pH is adjusted by adjusting the addition amount of the sulfurizing agent and addition of the neutralizer. While the neutralizer is not particularly limited, alkali salts such as sodium hydroxide, calcium hydroxide, sodium carbonate, cobalt carbonate, or the like can be used.
(Neutralization Step S2)

The neutralization step S2 will be described. The neutralization step S2 is a step of adding the neutralizer or the carbonation agent to the cobalt chloride solution having undergone through the copper removal step S1, generating cobalt hydroxide or basic cobalt carbonate, and separating cobalt from magnesium remaining in the solution.

In the neutralization step S2, the pH is maintained to be in a range of 6.5 to 7.0. When the pH is in the range of 6.5 to 7.0, cobalt and magnesium can be separated by precipitating cobalt and leaving magnesium in the liquid.

When the pH is lower than 6.5, a precipitation rate of cobalt decreases, which is not preferable. On the other hand, the pH exceeds 7, while the precipitation rate of magnesium also increases, a separation efficiency from cobalt decreases, which is not preferable.

By adjusting the temperature in a range of over 40° C. to 60° C., magnesium can be separated more efficiently.

In the neutralization step S2 of the present invention, it is preferable to use a countercurrent multistage method for adding the neutralizer or the carbonation agent. The neutralization method by the countercurrent multistage method will be specifically described in the following.

A treatment of neutralization or carbonation is performed by adding the neutralizer or the carbonation agent in the solution to obtain a precipitate of a neutralized substance or a carbonate. In this respect, in an only one-stage (one-time) neutralization or carbonation, which is generally performed, a part of cobalt contained in the solution remains unreacted in the solution, in some cases.

When a cobalt grade in a starting liquid to be used in the neutralization step S2 is low, the cobalt grade in the obtained precipitate is also relatively low, and thus, efficiency of a post-step of refining cobalt is decreased.

Furthermore, some of the neutralizer or the carbonation agent to be added are mixed with the precipitate without reacting, which is not preferable in terms of cost.

In view of this, in the present invention, in order to completely neutralize or carbonate cobalt, the solution is neutralized or carbonated again, that is, in two or more stages.

In this respect, all or part of the cobalt hydroxide or the basic cobalt carbonate obtained in second stage neutralization or carbonation is used and added as the neutralizer or the carbonation agent in the above-described first stage neutralization or carbonation.

By repeatedly using the cobalt hydroxide or the cobalt carbonate obtained in the second stage neutralization or carbonation, the concentration of cobalt inside the reaction container will increase in the first stage neutralization or carbonation described above, and thus, the cobalt grade of the precipitate obtained in the first stage becomes higher to that extent, resulting in enabling efficient treatment in the post-step. It is possible to reduce cost for the neutralizer or the carbonation agent.

Furthermore, by performing the neutralization or the carbonation in a third and subsequent stages in the same way, the cobalt hydroxide or the basic cobalt carbonate obtained in the third neutralization or carbonation can be added as the neutralizer or the carbonation agent in the second stage.

Thus, by performing the neutralization or the carbonation in multiple stages and supplying a products produced by the neutralization or the carbonation to the previous stage, that is, by using the countercurrent multistage method that repeats in the opposite direction (countercurrent) to a flow of liquid, the loss of cobalt is reduced, and simultaneously the loss of the unreacted and remaining neutralizer or carbonation agent is reduced, leading to reduction of cost.

While a count of stages of the neutralization or the carbonation is not particularly limited and may be two or more stages, since too many stages will increase the cost in terms of equipment, it is preferably 10 stages or less.

Since, obviously, there is no precipitate of the cobalt hydroxide or the cobalt carbonate that should be repeated at a time of starting operation of the process, or the like, it is only necessary in terms of countermeasures that, initially, in the first stage of the neutralization or the carbonation, addition of a precipitate of cobalt is omitted, or a precipitate of cobalt obtained elsewhere is used.

By executing the neutralization step using such a countercurrent multistage method, it is possible to achieve both reduction of cobalt remaining in the solution and separation of magnesium.

(Leaching Step S3)

The leaching step S3 is a step of adding sulfuric acid to the cobalt hydroxide or the basic cobalt carbonate obtained in the neutralization step S2 to leach (dissolve) it and obtaining the cobalt sulfate solution.

By adjusting the pH in the range of 2.0 to 5.0 at a time of leaching, it is possible to decrease mixing of iron and aluminum as the impurities, and simultaneously, reduce the amount of the neutralizer used in the solvent extraction step S4 as the next step.

When the pH is 2.0 or less, an amount of the neutralizer used in the next step increases due to excessive addition of acid. When the pH is 5.0 or more, a leaching rate of cobalt is decreased. Thus, it is preferable to set the pH in the range of 2.0 to 5.0.

By the neutralization step S2 and the leaching step S3 of the present invention, it is possible to convert a form from a cobalt chloride to the cobalt sulfate.

(Solvent Extraction Step S4)

The solvent extraction step S4 is a step of bringing the organic solvent containing the alkyl phosphoric acid-based extractant into contact with the cobalt sulfate solution to extract zinc, manganese, and calcium into the organic solvent and separating and removing these impurities.

As the organic solvent, an alkyl phosphoric acid-based extractant diluted with a diluent is used. The alkyl phosphoric acid-based extractant includes bis (2-ethylhexyl) hydrogen phosphate (Product name D2EHPA), 2-ethylhexyl hydrogen-2-ethylhexylphosphonate (Product name PC-88A), and Diisooctylphosphinic acid (Product name CYANEX272). Among these substances, in a case of separating zinc, manganese and calcium from the cobalt sulfate solution where copper is removed, it is preferable to use bis (2-ethylhexyl) hydrogen phosphate having high separability from cobalt as an extractant.

The diluent is not particularly limited as long as it can dissolve an extractant. As the diluent, for example, a naphthene-based solvent or an aromatic-based solvent can be used. The concentration of the extractant is preferably adjusted to 10 volume % to 60 volume %, more preferably 20 volume % to 50 volume %. When the concentration of the extractant falls in this range, it is possible to sufficiently extract impurity elements having high concentration and impurity elements having low distribution ratio (element concentration in the organic substance/element concentration in the solution). On the other hand, when the concentration of the extractant is less than 10 volume %, the impurity elements having high concentration and impurity elements having low distribution ratio cannot be sufficiently extracted and are likely to remain in the cobalt sulfate solution. Further, when the concentration of the extractant exceeds 60 volume %, a viscosity of the extractant becomes high, and phase separability after an extraction operation between the organic solvent (an organic phase) and the cobalt sulfate solution (an aqueous phase) deteriorates.

As indicated in Formula 4, an acid extractant such as the alkyl phosphoric acid-based extractant is an extractant that extracts a metal ion by substituting —H contained in the extractant with a cation in an aqueous phase to form a metal salt. Typically, the higher the pH, the easier it is for the metal ion to be extracted into an organic phase, and when the pH is lowered, the reaction of Formula 4 proceeds in the opposite direction, and the metal ion extracted in the organic phase is easily back-extracted in the aqueous phase.

Because the extracted pH differs depending on the type of metal ion, in the solvent extraction step using an acid extractant, a target element and the impurity element are separated by controlling the pH.

$$n\mathrm{RH}_{org} + \mathrm{M}_{aq}^{n+} \rightarrow \mathrm{MR}_{norg} + n\mathrm{H}_{aq}^{+} \qquad \text{(Formula 4)}$$

Here, RH in the Formula indicates an acid extractant, $M^{n+}$ indicated an n-valent metal ion, org indicates an organic phase, and aq indicates an aqueous phase.

Thus, in the solvent extraction step S4, it is desirable to adjust the pH of the cobalt sulfate solution to 1.5 to 3.0. In this pH region, the extraction rates of zinc, manganese, and calcium tend to be higher than the extraction rate of cobalt, and it is possible to separate cobalt by leaving cobalt in the aqueous phase and extracting these impurity elements in the organic phase.

When pH is less than 1.5, the extraction rates of these impurities are low, and it becomes difficult to separate them from cobalt. When the pH exceeds 3.0, the extraction rate of cobalt also increases and the separability from the impurities decreases. While when the pH is adjusted to 1.5 to 3.0, a part of cobalt is extracted in some cases, it is also possible to reduce a loss of cobalt by bringing the organic phase after extraction into contact with a sulfuric acid solution having a pH lower than that at a time of extraction and back-extracting cobalt to recover.

pH 2.5 shown in Table 1 to adjust the redox potential to −50 mV (based on the Ag/AgCl electrodes), and the precipitate of the sulfide of copper was generated. The precipitate was separated and removed by a filter to obtain a filtrate having the composition indicated by post-sulfurization B in Table 1. The concentration of copper was less than 0.001 g/L, and copper was able to be separated and removed.

TABLE 1

| Element | Co | Cu | Zn | Mn | Ca | Mg |
|---|---|---|---|---|---|---|
| Original liquid A | 83 | 0.01 | 0.07 | 0.11 | 4 | 0.093 |
| Post-sulfurization B | 76 | <0.001 | 0.066 | 0.09 | 3.9 | 0.083 |
| Post-first SX C | 56 | <0.001 | <0.001 | <0.001 | <0.001 | 0.028 |
| Post-second SX D | 110 | <0.001 | <0.001 | <0.001 | <0.001 | <0.001 |

(Unit: g/L for all elements)

Furthermore, when this organic phase is brought into contact with an acidic solution having a pH of 1 or less, most of the extracted metal ions can be back-extracted into the aqueous phase, and the organic phase after back-extraction can be reused.

(Crystallization Step S5)

In the crystallization step S5, cobalt sulfate crystals are precipitated from the cobalt sulfate solution obtained in the solvent extraction step S4. The crystallization method is not particularly limited, and a general crystallization method can be used.

Examples of the crystallization method include a method in which cobalt sulfate solution is housed in a crystallization can and crystallized inside the crystallization can to obtain crystals. The crystallization can precipitates crystals by evaporating the water content in the cobalt sulfate solution under a predetermined pressure, and, for example, a rotatory evaporator type or a double propeller type crystallization can is used. An internal pressure is reduced by a vacuum pomp or the like, and crystallization proceeds while a flask is rotated in the rotatory evaporator or while a flask is stirred with the double propeller. Inside the crystallization can, the cobalt sulfate crystals are mixed with the cobalt sulfate solution to be slurry.

The slurry discharged from the crystallization can is solid-liquid separated into the cobalt sulfate crystals and a mother liquor by a filter, a centrifugal separator, or the like. Subsequently, the cobalt sulfate crystals are dried by a dryer to remove water content.

By the above-described method, the cobalt sulfate crystals can be produced from the cobalt sulfate solution. Obviously, since the cobalt sulfate solution is highly pure with a trace amount of impurities, the obtained cobalt sulfate crystals are also highly pure with a trace amount of impurities.

EXAMPLES

While the following describes the examples of the present invention in more detail, the present invention is not limited to the following examples.

Example 1

(Copper Removal Step S1)

The sodium hydrosulfide solution was added as the sulfurizing agent to 2 L of the cobalt chloride solution having the composition indicated in an original liquid A adjusted to (Neutralization Step S2)

Next, influences of the pH and temperature in the neutralization step was confirmed.

The cobalt chloride solution having the composition indicated in post-sulfurization B in Table 1 was divided by 100 ml, and then, while maintaining it at temperatures of 20° C., 40° C., and 60° C., 100 g/l of calcium hydroxide slurry was added with stirring to adjust the pH to a predetermined pH value in the range of 5.7 to 8 to make it into a neutralized slurry, and then filtration was performed.

20 ml of pure water was added to each of the cobalt hydroxide precipitates obtained by filtration and stirring was performed, and then filtration was performed again to remove the solution attached to the precipitate, and thus, the cobalt hydroxide after washing was obtained, and then contained cobalt and magnesium were analyzed.

From a material amount of cobalt and magnesium contained in the washed cobalt hydroxide obtained under each neutralization condition and a material amount of cobalt and magnesium contained in liquid of the post-sulfurization B used for the neutralization, a ratio distributed to the precipitate by neutralization was calculated as a precipitation rate.

Figure 2:
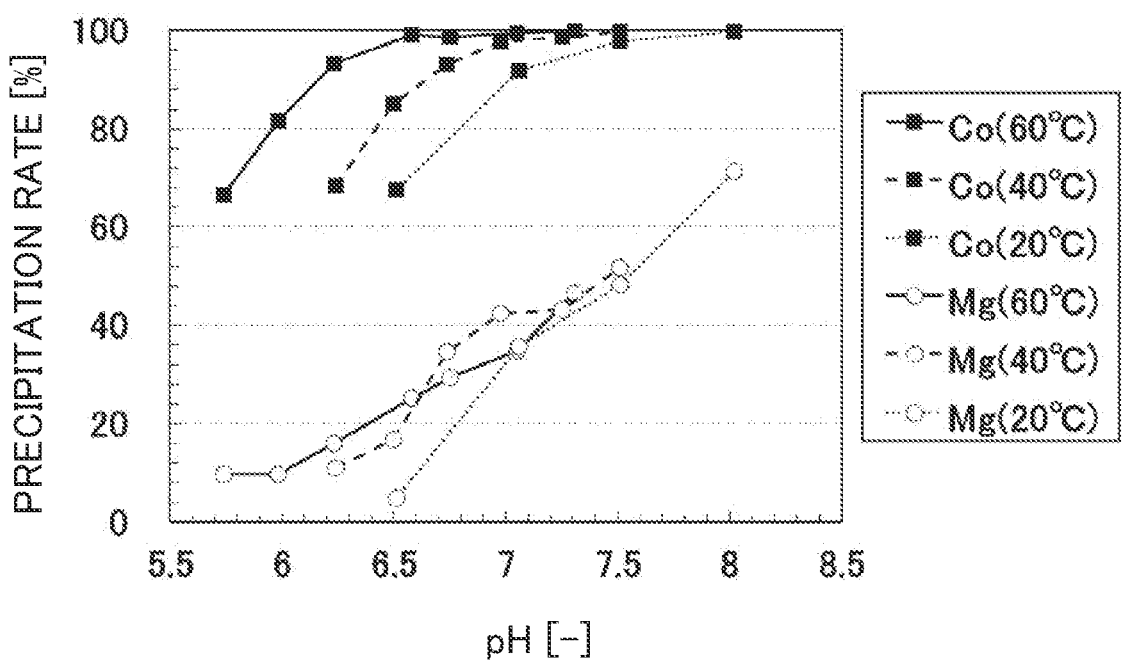
FIG. 2 is a diagram illustrating a pH and precipitation rates of cobalt and magnesium in a neutralization step.

Relationship between the precipitation rates of cobalt and magnesium neutralized at each temperature and pH is indicated in FIG. 2.

The precipitation rate of cobalt indicated a tendency to improve as the temperature increased, even at a lower pH.

For example, while at 20° C. cobalt cannot be precipitated almost completely unless the pH reaches 7.5 to 8.0, at 40° C., cobalt can be precipitated at about pH 7 to pH 7.5, and at 60° C., cobalt can be completely precipitated at pH 6.5

On the other hand, while the precipitation rate of magnesium has little dependence on the temperature, the precipitation rate tends to increase as the pH increases. For example, while at pH 6.5, the precipitation rate is about 20% to 25%, at pH 7, it increases up to about 40%, and at pH 8, about 70% of magnesium precipitates.

Figure 3:
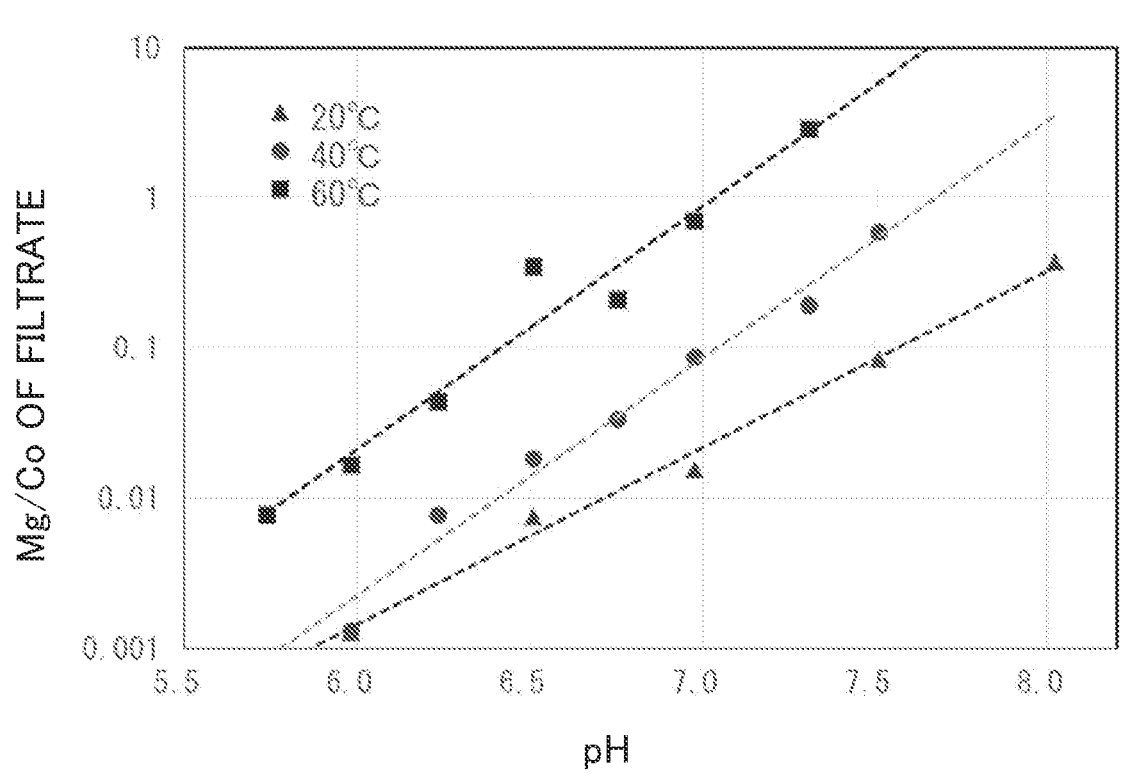
FIG. 3 is a diagram illustrating a relation between temperatures and a magnesium/cobalt ratio in a filtrate in the neutralization step.

FIG. 3 indicates an analytical values of cobalt and magnesium in the filtrate generated by the neutralization as a ratio of Mg/Co. Since it is the Mg/Co concentration ratio in the filtrate, the larger the number, the smaller the ratio of cobalt to magnesium in the filtrate, that is, it is indicated that in the precipitate, on the contrary, cobalt has a larger proportion than magnesium and has excellent selectivity.

The pH of the post-sulfurization liquid B indicated in Table 1 before being used for neutralization was approximately 0.8. Since the cobalt concentration was 76 g/l, and the magnesium concentration was 0.083 g/l, the Mg/Co ratio was 0.001.

The selectivity of cobalt showed tendency of being improved at each pH when the temperature became higher than 20° C., that is, the temperature became 40° C. and further 60° C.

Consequently, in order to improve a recovery rate of cobalt, it is preferable to perform the neutralization at the pH in the range of 6.5 to 7.0 and at a temperature of about 60° C. where good selectivity can be obtained, as much as possible.

While it can be expected that the separability from magnesium will be further improved even at a temperature exceeding 60° C., it is preferable to industrially set the temperature up to about 60° C. from the viewpoint of heat resistance issues of materials used for equipment, increase in energy required for heating, safety in handling high temperature substances, and the like.

Next, the neutralization using the countercurrent multistage method was performed.

The solution obtained by performing the operation same as the operation of the neutralization step S2 from the liquid of the post-sulfurization B obtained in the copper removal step S1 was divided by 100 ml, and while it was adjusted to (Leaching Step S3)

64 wt % sulfuric acid was added to the cobalt hydroxide obtained by Example 3 to adjust the pH to 2.0, and leaching was performed to obtain the cobalt sulfate solution.

(Solvent Extraction Step S4)

An organic phase diluted with a diluent (Product name Teclean N20 manufactured by JXTG Nippon Oil & Energy Corporation) was prepared such that a concentration of an alkyl phosphoric acid-based extractant (Product name D2EHPA manufactured by DAIHACHI CHEMICAL INDUSTRY Corporation) was 40 volume %. Aqueous phase of 0.9 L contained in the cobalt sulfate solution obtained in the copper removal step S1 and 1.8 L of organic phase were mixed, and a sodium hydroxide solution was added to adjust the pH to 1.7, and then impurities were extracted. The same extraction operation was repeated with 0.9 L of aqueous phase after extraction and 1.8 L of new organic phase, and the extraction operations were performed three times in total. As a result, the cobalt chloride solution having a composition indicated in post-first SX C in the above-described Table 1 was obtained. The concentrations of zinc, manganese, and calcium were all less than 0.001 g/L, and these impurities were able to be separated and removed.

TABLE 2

| pH of one-stage neutralization | pH of two-stage neutralization | Temperature [° C.] | Cobalt yield [%] | Magnesium removal rate [%] |
|---|---|---|---|---|
| 5.8 | 8.0 | 60 | >99.9 | 72 |
| 6.0 | 8.0 | 60 | >99.9 | 68 |
| 6.2 | 8.0 | 60 | >99.9 | 58 |
| 6.0 | 9.0 | 60 | >99.9 | 28 | a predetermined temperature, 100 g/l of calcium hydroxide slurry was added to adjust the pH to a predetermined pH to make it into a neutralized slurry, and then the filtration was performed.

While the obtained filtrate was adjusted to a predetermined temperature, 100 g/l of calcium hydroxide slurry was added to adjust the pH to a predetermined pH, and the filtration was performed.

The obtained precipitate was added to 100 ml of solution obtained by performing the same operation, and while it was adjusted to a predetermined temperature, 100 g/l of calcium hydroxide slurry was added to adjust the pH to a predetermined pH, and the filtration was performed. The attached solution was removed by adding 20 ml of pure water to the precipitate of the filtered cobalt hydroxide and filtering again to obtain the cobalt hydroxide. As a result, the cobalt hydroxide by a countercurrent two-stage neutralization reaction was obtained.

Table 2 indicates each neutralization pH condition, the composition of the obtained cobalt sulfate solution, a yield of cobalt obtained as cobalt sulfate, and a removal rate of magnesium. The yield and the removal rate were calculated assuming that a total of material amounts contained in the obtained cobalt sulfate solution and the second neutralized filtrate was 100%.

Compared with a case where the neutralization indicated in FIG. 2 was performed in one stage, the recovery rate (precipitation rate) of cobalt at the same pH was significantly increased. When the pH of the second stage of the neutralization became 9 or more, the removal rate of magnesium (an identical value to 100%–the precipitation rate) was significantly decreased due to the increase in the precipitation of magnesium.

(Crystallization Step S5)

The cobalt sulfate solution was inserted into a rotatory evaporator and the inside was depressurized with a vacuum pump, and the water was evaporated while the temperature was maintained at 40° C. and a flask portion was rotated, and crystals of cobalt sulfate were precipitated. After solid-liquid separation, the obtained crystals of cobalt sulfate were dried by a dryer. As a result, high purity cobalt sulfate crystals indicated in Table 3 were obtained.

TABLE 3

| | Element | | | | | |
|---|---|---|---|---|---|---|
| Element | Co | Cu | Za | Mn | Ca | Mg |
| Concentration | 22 | <1 | <1 | <5 | <10 | <1 |

(Unit: % for Co and ppm for other elements)

From the results of Examples described above, it can be seen that according to the present invention, a high purity cobalt sulfate from which impurities can be sufficiently removed is obtained.

INDUSTRIAL APPLICABILITY

The high purity cobalt sulfate crystal obtained by the present invention can be used as a raw material for a lithium ion secondary battery and can be used for various applications.

REFERENCE SIGNS LIST

S1 copper removal step
S2 neutralization step

S3 leaching step

S4 solvent extraction step

S5 crystallization step

The invention claimed is:

1. A method for production of cobalt sulfate, comprising:

a copper removal step of adding $H_2S$, $Na_2S$, or NaHS to a cobalt chloride solution containing one or more impurities of copper, zinc, manganese, calcium, and magnesium and generating a precipitate of sulfide of copper to separate to remove copper;

a neutralization step of adjusting a pH of a cobalt chloride solution having undergone the copper removal step to 6.5 to 7.0 so as to form a precipitate in the liquid of the solution having undergone the neutralization step and separating the precipitate from the liquid;

a leaching step of adding sulfuric acid to the separated precipitate to obtain cobalt sulfate solution; and a solvent extraction step of bringing an organic solvent containing an alkyl phosphoric acid-based extractant to the cobalt sulfate solution and extracting zinc, manganese, and calcium into the organic solvent to separate to remove zinc, manganese, and calcium, wherein these steps are sequentially executed.

2. The method for production of cobalt sulfate according to claim 1, wherein separation of the liquid and the precipitate in the neutralization step is performed by a countercurrent multistage method.

3. The method for production of cobalt sulfate according to claim 1, wherein a cobalt sulfate solution obtained through the solvent extraction step is subjected to a crystallization step to obtain crystals of the cobalt sulfate.

4. The method for production of cobalt sulfate according to claim 1, wherein in the copper removal step, a redox potential of the cobalt chloride solution is adjusted to −100 mV to 200 mV (based on an Ag/AgCl electrodes) and the pH to 1.3 to 3.0.

5. The method for production of cobalt sulfate according to claim 1, wherein in the leaching step, the pH is adjusted to 2.0 to 5.0 to obtain the cobalt sulfate solution.

6. The method for production of cobalt sulfate according to claim 1, wherein in the solvent extraction step, the alkyl phosphoric acid-based extractant is bis (2-ethylhexyl) hydrogen phosphate, and the pH of the cobalt sulfate solution where copper and magnesium are removed is adjusted to 1.5 to 3.0 to be subjected to a solvent extraction using the extractant, and impurity elements are extracted into the organic solvent.

* * * * *